(12) United States Patent
Weuthen et al.

(10) Patent No.: US 6,831,052 B2
(45) Date of Patent: Dec. 14, 2004

(54) CLEANING COMPOSITIONS CONTAINING HYDROXY MIXED ETHERS, METHODS OF PREPARING THE SAME, AND USES THEREFOR

(75) Inventors: Manfred Weuthen, Langenfeld (DE); Hans-Christian Raths, Monheim (DE); Michael Elsner, Helligenhaus (DE)

(73) Assignee: Cognis Deutschland GmbH, Duesseldorf (DE)

( * ) Notice: Subject to any disclaimer, the term of this patent is extended or adjusted under 35 U.S.C. 154(b) by 0 days.

(21) Appl. No.: 10/062,101

(22) Filed: Jan. 31, 2002

(65) Prior Publication Data

US 2003/0045448 A1 Mar. 6, 2003

(30) Foreign Application Priority Data

Feb. 1, 2001 (DE) .......................................... 101 04 368

(51) Int. Cl.⁷ ............................. C11D 1/722; C11D 3/37
(52) U.S. Cl. .................... 510/356; 510/360; 510/421; 510/422; 510/470; 510/475; 510/505; 510/506
(58) Field of Search ................................ 510/356, 360, 510/421, 422, 470, 475, 505, 506

(56) References Cited

U.S. PATENT DOCUMENTS

| | | | |
|---|---|---|---|
| 4,836,951 A | | 6/1989 | Totten et al. |
| 4,898,621 A | * | 2/1990 | Pruehs et al. ............... 134/25.2 |
| 4,925,587 A | * | 5/1990 | Schenker et al. ...... 252/174.22 |
| 5,312,932 A | | 5/1994 | Behler et al. |
| 5,322,957 A | | 6/1994 | Fabry et al. |
| 5,484,531 A | | 1/1996 | Kuehne et al. |
| 5,759,987 A | | 6/1998 | Haerer et al. |
| 6,530,383 B1 | * | 3/2003 | Rogmann et al. .......... 134/25.2 |
| 2002/0107165 A1 | * | 8/2002 | Weuthen et al. ............ 510/421 |
| 2003/0027736 A1 | * | 2/2003 | Raths et al. ................ 510/220 |
| 2003/0045448 A1 | * | 3/2003 | Weuthen et al. ............ 510/421 |
| 2003/0119695 A1 | * | 6/2003 | Weuthen ..................... 510/295 |

FOREIGN PATENT DOCUMENTS

| | | | |
|---|---|---|---|
| DE | 24 32 757 A1 | 1/1976 | |
| DE | 2432757 | * 1/1976 | ........... C07C/43/11 |
| DE | 42 04 700 A1 | 8/1993 | |
| DE | 43 23 252 C2 | 1/1995 | |
| DE | 197 38 866 A1 | 3/1999 | |
| DE | 19738866 | * 3/1999 | ........... C11D/1/825 |
| DE | 10117500 | * 10/2002 | ............ A61K/7/50 |
| EP | 0 299 360 A2 | 1/1989 | |
| EP | 0 561 825 B1 | 9/1995 | |
| EP | 0 561 999 B1 | 1/1996 | |
| EP | WO 00/46327 | * 8/2000 | ........... C11D/1/825 |
| EP | WO 01/55285 | * 8/2001 | ........... C11D/1/825 |
| EP | WO 01/55288 | * 8/2001 | ........... C11D/1/825 |
| EP | WO 01/55289 | * 8/2001 | ........... C11D/1/825 |
| EP | 1 167 499 A1 | 1/2002 | |

OTHER PUBLICATIONS

Biermann, et al., "Alkylpolyglucoside—Technologie und Elgenschaften", Starch/Stärke, vol 45, VCH Verlagsgesellschaft mbH, Weinheim, (1993), pp. 281–288, no month given; Not Translated.

Salka, "Alkyl Polyglycosides Properties and Applications", Cosmetics & Toiletries, vol. 108, (Mar., 1993), pp. 89–94.

Kahre, et al, "Alkylpolyglycoside—Ein neues Konzept für Pflege und Verträglichkeit in der Kosmetik", SÖFW–Journal, vol. 121, No. 8, (1995), pp. 598, 600–601, 604–611, no month given; Not Translated.

Biswas, et al., "Surface–Active Properties of Sodium Salts of Sulfated Fatty Acid Monoglycerides", The Journal Of The American Oil Chemists' Society, vol. 37, (Apr., 1960), pp. 171–175.

Ahmed, "Efficient Synthesis of Fatty Monoglyceride Sulfates from Fatty Acids and Fatty Acid Methyl Esters", JAOCS, vol. 67, No. 1, (Jan., 1990), pp. 8–14.

* cited by examiner

Primary Examiner—Brian P. Mruk
(74) Attorney, Agent, or Firm—Aaron R. Ettelman

(57) ABSTRACT

Cleaning compositions containing hydroxy mixed ethers of the general formula (I) are described:

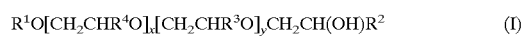

$$R^1O[CH_2CHR^4O]_x[CH_2CHR^3O]_yCH_2CH(OH)R^2 \quad (I)$$

wherein $R^1$ represents an alk(en)yl radical having from 4 to 22 carbon atoms; $R^2$ represents an alk(en)yl radical having from 2 to 22 carbon atoms; $R^3$ represents a hydrogen or a methyl radical; $R^4$ represents a hydrogen or a methyl radical; x is from 1 to 40; y is from 1 to 40; and x+y>=1; and wherein the alkylene units —$CH_2CHR^3O$— and —$CH_2CHR^4O$— are in randomized form, preferably in an ethylene oxide to propylene oxide ratio of from 40:1 to 40:5. Methods of preparing and using the hydroxy mixed ethers are also described.

9 Claims, No Drawings

CLEANING COMPOSITIONS CONTAINING HYDROXY MIXED ETHERS, METHODS OF PREPARING THE SAME, AND USES THEREFOR

BACKGROUND OF THE INVENTION

Compositions for washing and cleaning hard nontextile surfaces in the household and commercial sector are generally intended to develop a small foam volume on use, which further reduces significantly within a few minutes. Compositions of this kind have been known for a long time and are established on the market. They essentially comprise aqueous surfactant solutions of different kinds with or without the addition of builders, solubilizers (hydrotropes) or solvents. At the beginning of cleaning work, the consumer does in fact desire a certain foaming of the application solution, for the purpose of demonstrating effectiveness, but the foam ought rapidly to collapse so that areas once cleaned need not be wiped again. For this purpose, the compositions-of the type mentioned are normally formulated with low-foaming nonionic surfactants.

For machine-washed kitchen- and tableware, more stringent requirements are nowadays imposed than for hand-washed ware. For instance, even ware fully cleaned of its food residues is considered imperfect if, following machine washing, it still has whitish spots, originating from water hardness or other mineral salts, which derive from dried-on water droplets for lack of wetting agents. In order to obtain spotless ware with a clear luster, therefore, rinse aids are used. The addition of liquid or solid rinse aid, which may be added separately or may already be present in a ready-to-use presentation form together with the detergent and/or regenerating salt ("2 in 1", "3 in 1", e.g., in the form of tabs and powders), ensures that the water runs off as fully as possible from the ware so that at the end of the wash program the various surfaces are lustrous and free from residue.

Customary commercial rinse agents constitute mixtures of, for example, nonionic surfactants, solubilizers, organic acids and solvents, water and, where appropriate, preservatives and fragrances.

The function of the surfactants in these compositions is to influence the surface tension of water in such a way that it is able to run off in an extremely thin coherent film from the ware so that no water droplets, streaks or films remain in the subsequent drying process (the effect referred to as wetting).

Accordingly, surfactants in rinse aids are also required to suppress the foam which occurs as a result of food residues in the dishwasher. Since the rinse aids usually include acids for enhancing the dry-clear effect, the surfactants used must also be relatively hydrolysis-insensitive to acids. Rinse aids are used both in the household and in the commercial sector. In domestic dishwashers, the rinse aid is normally metered in after the prewash cycle and cleaning cycle at just 40° C.–65° C. The commercial dishwashers operate with only one wash liquor, which is refreshed only by addition of the rinse solution from the preceding wash. Throughout the entire wash program, therefore, the water is never completely replaced. Accordingly, the rinse aid must also have a foam suppressing effect, must be temperature-stable at a sharp temperature gradient of 85–35° C., and must also be sufficiently stable toward alkali and active chlorine.

The German laid-open specification DE 19738866 describes surfactant mixtures comprising hydroxy mixed ethers and nonionic surfactants, such as fatty alcohol polyethylene glycol/polypropylene glycol ethers, where appropriate with endgroup capping, which exhibit very good foaming behavior and display outstanding rinse-clear effects in rinse agents.

From the German laid-open specification DT 2432757 it is known that hydroxy mixed ethers are used as foam suppressants in detergents and cleaning products.

It was an object of the present invention to develop detergents and cleaning products which combine good foaming and cleaning behavior, in particular a very good runoff behavior on plastic surfaces and high material compatibility of the surfaces to be cleaned. Furthermore, the intention was to provide hydroxy mixed ethers which can be incorporated with particular advantage into solid formulations.

The object has been achieved by developing hydroxy mixed ethers which, in addition to their foam suppressing effect, also exhibit a high level of compatibility for plastic. Surprisingly, the hydroxy mixed ethers of the invention are particularly notable for their colorless, clear appearance, which opens up the possibility of incorporation into a large number of detergents and cleaning products without a complicated bleaching operation.

SUMMARY OF THE INVENTION

The invention provides detergents and cleaning products containing hydroxy mixed ethers (HMEs) of the formula (I):

$$R^1O[CH_2CHR^4O]_x[CH_2CHR^3O]_yCH_2CH(OH)R^2 \qquad (I)$$

in which $R^1$ stands for an alkyl and/or alkenyl radical having from 4 to 22 carbon atoms; $R^2$ stands for an alkyl and/or alkenyl radical having from 2 to 22 carbon atoms; $R^4$ stands for hydrogen or a methyl radical; $R^3$ stands for hydrogen or a methyl radical; x is from 1 to 40; y is from 1 to 40; and $x+y>=1$, characterized in that the alkylene units $[CH_2CHR^4O]$ and $[CH_2CHR^3O]$ are in randomized form.

Preference is given to those hydroxy mixed ethers which contain the alkylene units $[CH_2CHR^4O]$ and $[CH_2CHR^3O]$, preferably ethylene oxide and propylene oxide, in "randomized" form, i.e., the prior mixing of the alkoxylation reagents and reaction with the alcohol and subsequent epoxide closure produces hydroxy mixed ethers which possess a statistical, random distribution of the alkylene units. Particular preference is given to hydroxy mixed ethers containing ethylene oxide units and propylene oxide units randomized in a ratio of from 40:1 to 40:5.

DETAILED DESCRIPTION OF THE INVENTION

Hydroxy Mixed Ethers

Hydroxy mixed ethers are known from the literature and are described, for example, in the German Patent Publication DE 19738866.

They are prepared by reacting 1,2-epoxyalkanes ($R^2CHOCH_2$) in which $R^2$ stands for an alkyl and/or alkenyl radical having from 2 to 22, in particular from 6 to 16, carbon atoms with alkoxylated alcohols.

Preference is given in the context of the invention to those hydroxy mixed ethers which derive from alkoxylates of monohydric alcohols of the formula $R^1$—OH having from 4 to 18 carbon atoms in which $R^1$ stands for an aliphatic, saturated, straight-chain or branched alkyl radical, in particular having from 6 to 16 carbon atoms.

Examples of suitable straight-chain alcohols are 1-butanol, caproyl, enanthyl, caprylyl, pelargonyl, and capryl alcohol, 1-undecanol, lauryl alcohol, 1-tridecanol, myristyl alcohol, 1-pentadecanol, palmityl alcohol, 1-heptadecanol, stearyl alcohol, 1-nonadecanol, arachidyl alcohol, 1-heneicosanol, behenyl alcohol, and their technical-grade mixtures, such as are produced in the high-pressure hydrogenation of technical-grade methyl esters based on fats and oils. Examples of branched alcohols are those known as oxo alcohols, which carry usually from 2 to 4 methyl group branches and are prepared by the oxo process, and those known as guerbet alcohols, which are branched with an alkyl group in position 2. Suitable guerbet alcohols are 2-ethylhexanol, 2-butyloctanol, 2-hexyldecanol and/or 2-octyldodecanol.

The alcohols are used in the form of their alkoxylates, which are prepared conventionally by reacting the alcohols in randomized sequence with ethylene oxide and propylene oxide.

This results in hydroxy mixed ethers with EO and PO units in arbitrary sequence. Preference is given both to alkoxylates which are formed by reacting alcohol with mixtures of from 1 to 10 mol of propylene oxide ($R^4$=methyl, x=1–10 or $R^3$=methyl, y=1–10) and from 10 to 40 mol of ethylene oxide ($R^3$=hydrogen, y=10–40 or $R^4$=hydrogen, x=10–40).

Preference in the context of the invention is given to those hydroxy mixed ethers which derive from alkoxylates of monohydric alcohols of the formula $R^1$—OH having from 4 to 18 carbon atoms, preferably from 6 to 16 and in particular from 8 to 10 carbon atoms, in which $R^1$ stands for a linear or branched alkyl and/or alkenyl radical.

Very particular preference is given to hydroxy mixed ethers of the formula (I) in which $R^1$ stands for an alkyl radical having from 8 to 10 carbon atoms, based in particular on a natural fatty alcohol, $R^2$ stands for an alkyl radical having 10 carbon atoms, in particular for a linear alkyl radical.

Alkyl and/or Alkenyl Oligoglycosides

In a further embodiment, the detergents and cleaning products of the invention comprise alkyl and/or alkenyl oligoglycosides of the formula (II)

$$R^5O\text{—}[G]_p \tag{II}$$

in which $R^5$ stands for an alkyl and/or alkenyl radical having 4 to 22 carbon atoms, G for a sugar radical having 5 or 6 carbon atoms, and p for numbers from 1 to 10, are present.

They may be obtained by the relevant processes of preparative organic chemistry. As representatives of the extensive literature, reference may be made here to the review work by Biermann et al. in Starch/Stärke 45, 281 (1993), B. Salka in Cosm. Toil. 108, 89 (1993), and also J. Kahre et al. in SÖFW-Journal, Volume 8, 598 (1995).

The alkyl and/or alkenyl oligoglycosides may derive from aldoses and/or ketoses having 5 or 6 carbon atoms, preferably from glucose. The preferred alkyl and/or alkenyl oligoglycosides are therefore alkyl and/or alkenyl oligoglucosides.

The alkyl radical $R^5$ may derive from primary saturated alcohols. Typical examples are 1-butanol, caproyl, enanthyl, caprylyl, pelargonyl, and capryl alcohol, 1-undecanol, lauryl alcohol, 1-tridecanol, myristyl alcohol, 1-pentadecanol, cetyl alcohol, palmityl alcohol, 1-heptadecanol, stearyl alcohol, isostearyl alcohol, 1-nonadecanol, arachidyl alcohol, 1-heneicosanol, and behenyl alcohol, and also their technical-grade mixtures, as obtained, for example, in the hydrogenation of technical-grade fatty acid methyl esters or in the course of the hydrogenation of aldehydes from the Roelen oxo process.

The alkenyl radical $R^5$ may derive from primary unsaturated alcohols. Typical examples of unsaturated alcohols are undecen-1-ol, oleyl alcohol, elaidyl alcohol, ricinoleyl alcohol, linoleyl alcohol, linolenyl alcohol, gadoleyl alcohol, arachidonyl alcohol, erucyl alcohol, brassidyl alcohol, palmoleyl alcohol, petroselinyl alcohol, arachyl alcohol, and also their technical-grade mixtures, which may be obtained as described above.

Preference is given to alkyl and/or alkenyl radical $R^5$ which derive from primary alcohols having from 6 to 16 carbon atoms.

Particularly suitable are alkyl oligoglucosides of chain length $C_8$–$C_{10}$ which are obtained as an initial fraction in the distillative separation of technical-grade $C_8$–$C_{18}$ coconut fatty alcohol and may have an impurities fraction of less than 6% by weight of $C_{12}$ alcohol, and also alkyl oligoglucosides based on technical-grade $C_{9/11}$ oxo alcohols.

The alkyl and/or alkenyl radical $R^5$ may further derive from primary alcohols having from 12 to 14 carbon atoms.

The index p in the general formula (II) indicates the degree of oligomerization (DP), i.e., the distribution of monoglycosides and oligoglycosides, and stands for a number between 1 and 10. While p in a given compound must always be integral and in this case may adopt in particular the values p=1 to 3, the value p for a particular alkyl oligoglycoside is an analytically determined arithmetic variable which usually represents a fractional number.

Preference is given to using alkyl and/or alkenyl oligoglycosides having an average degree of oligomerization p of from 1.1 to 2.0. From a performance standpoint, preference is given to those alkyl and/or alkenyl oligoglycosides whose degree of oligomerization is less than 2.0 and is in particular between 1.2 and 1.7.

It is preferred to use alkyl and/or alkenyl oligoglycosides of the formula (II) in which p stands for numbers from 1 to 3 and $R^5$ stands for an alkyl radical having from 6 to 16 carbon atoms.

In one preferred embodiment the detergents and cleaning products of the invention contain from 0.01 to 25% by weight, preferably from 0.025 to 20% by weight, and in particular from 0.1 to 15% by weight of hydroxy mixed ethers of the formula (I) calculated as active substance, based on the compositions. Active substance is defined as the mass of surfactants (calculated as pure material at 100%) which are present in the detergent and cleaning product.

In a further embodiment the detergents and cleaning products of the invention contain from 0.01 to 30% by weight, preferably from 0.1 to 20% by weight, and in particular from 0.2 to 15% by weight of alkyl and/or alkenyl oligoglycosides of the formula (II) calculated as active substance, based on the compositions.

Nonionic Surfactants

The compositions of the invention may comprise further nonionic surfactants. Typical examples of nonionic surfactants are alkoxylates of alkanols, endgroup-capped alkoxylates of alkanols without free OH groups, alkoxylated fatty acid lower alkyl esters, amine oxides, alkylphenol polyglycol ethers, fatty acid polyglycol esters, fatty acid amide polyglycol ethers, fatty amine polyglycol ethers, alkoxylated triglycerides, mixed ethers and mixed formals, fatty acid N-alkylglucamides, protein hydrolysates (particularly plant products based on wheat), polyol fatty acid esters, sugar esters, sorbitan esters, and polysorbates. Where the nonionic surfactants contain polyglycol ether chains, these may have a conventional but preferably have a narrowed homolog distribution.

Preferably the further nonionic surfactants are selected from the group formed by alkoxylates of alkanols, especially fatty alcohol polyethylene glycol/polypropylene glycol ethers (FAEO/PO) of the formula (III) and fatty alcohol polypropylene glycol/polyethylene glycol ethers (FAPO/EO) of the formula (IV), endgroup-capped alkoxylates of alkanols, especially endgroup-capped fatty alcohol polyethylene glycol/polypropylene glycol ethers and endgroup-capped fatty alcohol polypropylene glycol/polyethylene glycol ethers, and fatty acid lower alkyl esters and amine oxides.

Fatty Alcohol Polyethylene Glycol/Polypropylene Glycol Ethers

In one preferred embodiment use is made of fatty alcohol polyethylene glycol/polypropylene glycol ethers of the formula (III):

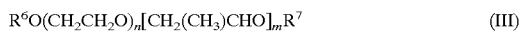

$$R^6O(CH_2CH_2O)_n[CH_2(CH_3)CHO]_mR^7 \quad (III)$$

with or without end group capping, in which $R^6$ stands for an alkyl and/or alkenyl radical having from 8 to 22 carbon atoms, $R^7$ for H or an alkyl radical having from 1 to 8 carbon atoms, n for a number from 1 to 40, preferably from 1 to 30, in particular from 1 to 15, and m for 0 or a number from 1 to 10.

Fatty Alcohol Polypropylene Glycol/Polyethylene Glycol Ethers

Likewise suitable are fatty alcohol polypolypropylene glycol/polyethylene glycol ethers of the formula (IV):

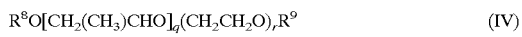

$$R^8O[CH_2(CH_3)CHO]_q(CH_2CH_2O)_rR^9 \quad (IV)$$

with or without end group capping, in which $R^8$ stands for an alkyl and/or alkenyl radical having from 8 to 22 carbon atoms, $R^9$ for H or an alkyl radical having from 1 to 8 carbon atoms, q for a number from 1 to 5, and r for a number from 0 to 15.

In accordance with one preferred embodiment, the compositions of the invention comprise fatty alcohol polyethylene glycol/polypropylene glycol ethers of the formula (III) in which $R^6$ stands for an aliphatic, saturated, straight-chain or branched alkyl radical having from 8 to 16 carbon atoms, n for a number from 1 to 10, and m for 0 and $R^7$ for hydrogen. These are adducts of from 1 to 10 mol of ethylene oxide with monofunctional alcohols. Suitable alcohols are the above-described alcohols such as fatty alcohols, oxo alcohols and guerbet alcohols. Also suitable are, among such alcohol ethoxylates, those which have a narrowed homolog distribution.

Further suitable representatives of endgroup-uncapped representatives are those of the formula (III) in which $R^6$ stands for an aliphatic, saturated, straight-chain or branched alkyl radical having from 8 to 16 carbon atoms, n for a number from 2 to 7, m for a number from 3 to 7, and $R^7$ for hydrogen. These are adducts of monofunctional alcohols of the type already described alkoxylated first with from 2 to 7 mol of ethylene oxide and then with from 3 to 7 mol of propylene oxide.

The endgroup-capped compounds of the formula (III) are capped with an alkyl group having from 1 to 8 carbon atoms ($R^7$). In many cases, compounds of this kind are referred to in the literature as mixed ethers. Suitable representatives are methyl-capped compounds of the formula (III) in which $R^6$ stands for an aliphatic, saturated, straight-chain or branched alkyl radical having from 8 to 16 carbon atoms, n for a number from 2 to 7, m for a number from 3 to 7, and $R^7$ for a methyl group. Compounds of this kind can be prepared easily by reacting the corresponding endgroup-uncapped fatty alcohol polyethylene glycol/polypropylene glycol ethers with methyl chloride in the presence of a base.

Suitable representatives of alkyl-capped compounds are those of the formula (III) in which $R^6$ stands for an aliphatic, saturated, straight-chain or branched alkyl radical having from 8 to 16 carbon atoms, n for a number from 5 to 15, m for 0, and $R^7$ for an alkyl group having from 4 to 8 carbon atoms. Preferably, endgroup capping is carried out with a straight-chain or branched butyl group by reacting the corresponding fatty alcohol polyethylene glycol ether with n-butyl chloride or with tert-butyl chloride in the presence of bases.

Instead of the compounds of the formula (III) or in a mixture with them it is possible if desired for endgroup-capped fatty alcohol polypropylene glycol/polyethylene glycol ethers of the formula (IV) to be present. Compounds of this kind are described, for example, in the German laid-open specification DE-A1-4323252. Particularly preferred representatives of the compounds of the formula (IV) are those in which $R^8$ stands for an aliphatic, saturated, straight-chain or branched alkyl radical having from 8 to 16 carbon atoms, q for a number from 1 to 5, r for a number from 1 to 6, and $R^9$ for hydrogen. They are preferably adducts of from 1 to 5 mol of propylene oxide and of from 1 to 6 mol of ethylene oxide with monofunctional alcohols, which have already been described as being suitable in connection with the hydroxy mixed ethers.

Alkoxylated Fatty Acid Lower Alkyl Esters

Suitable alkoxylated fatty acid lower alkyl esters include surfactants of the formula (V):

$$R^{10}CO—(OCH_2CHR^{11})_wOR^{12} \quad (V)$$

in which $R^{10}CO$ stands for a linear or branched, saturated and/or unsaturated acyl radical having from 6 to 22 carbon atoms, $R^{11}$ for hydrogen or methyl, $R^{12}$ for linear or branched alkyl radicals having from 1 to 4 carbon atoms, and w for numbers from 1 to 20. Typical examples are the formal insertion products of on average from 1 to 20 and preferably from 5 to 10 mol of ethylene oxide and/or propylene oxide into the methyl, ethyl, propyl, isopropyl, butyl, and tert-butyl esters of caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselinic acid, linoleic acid, linolenic acid, elaeostearic acid, arachic acid, gadoleic acid, behenic acid, and erucic acid, and also their technical-grade mixtures. The products are normally prepared by inserting the alkylene oxides into the carbonyl ester linkage in the presence of specific catalysts, such as calcined hydrotalcite, for example. Particular preference is given to reaction products of on average from 5 to 10 mol of ethylene oxide into the ester linkage of technical-grade coconut fatty acid methyl esters.

Amine Oxides

As amine oxides it is possible to use compounds of the formula (VI) and/or (VII):

(VI)

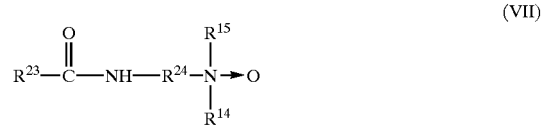

(VII)

The preparation of the amine oxides of the formula (VI) involves starting from tertiary fatty amines containing at least one long alkyl radical and oxidizing them in the presence of hydrogen peroxide. In the amine oxides of the formula (VI) that are contemplated in the context of the invention, $R^{13}$ stands for a linear or branched alkyl radical having from 6 to 22, preferably from 12 to 18, carbon atoms, and $R^{14}$ and $R^{15}$ stand independently of one another for $R^{13}$ or an optionally hydroxy-substituted alkyl radical having from 1 to 4 carbon atoms. It is preferred to use amine oxides of the formula (VI) in which $R^{13}$ and $R^{14}$ stand for $C_{12/14}$ and/or $C_{12/18}$ cocoalkyl radicals and $R^{15}$ denotes a methyl or a hydroxyethyl radical. Likewise preferred are amine oxides of the formula (VI) in which $R^{13}$ stands for $C_{12/14}$ and/or $C_{12/18}$ cocoalkyl radicals and $R^{14}$ and $R^{15}$ have the definition of a methyl or hydroxyethyl radical.

Further suitable amine oxides are alkylamido-amine oxides of the formula (VII) in which the alkylamido radical $R^{23}CONH$ comes about through the reaction of linear or branched carboxylic acids, preferably having from 6 to 22, more preferably having from 12 to 18, carbon atoms, in particular of $C_{12/14}$ and/or $C_{12/18}$ fatty acids with amines. $R^{24}$ represents a linear or branched alkylene group having from 2 to 6, preferably from 2 to 4, carbon atoms and $R^{14}$ and $R^{15}$ have the definition indicated in formula (VI).

The further nonionic surfactants may be present in the compositions of the invention in amounts of from 0.1 to 15% by weight, preferably from 0.5 to 10% by weight, in particular from 1 to 8% by weight, calculated as active substance, based on the compositions.

In accordance with the present invention, the detergents and cleaning products may comprise anionic surfactants.

Anionic Surfactants

Typical examples of anionic surfactants are soaps, alklylbenzenesulfonates, secondary alkanesulfonates, olefinsulfonates, alkyl ether sulfonates, glycerol ether sulfonates, α-methyl ester sulfonates, sulfo fatty acids, alkyl and/or alkenyl sulfates, alkyl ether sulfates, glycerol ether sulfates, hydroxymixed ether sulfates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid isethionates, fatty acid sarcosinates, fatty acid taurides, N-acyl amino acids such as, for example, acyl lactylates, acyl tartrates, acyl glutamates and acyl aspartates, alkyl oligoglucoside sulfates, protein fatty acid condensates (especially plant products based on wheat), and alkyl (ether) phosphates. Where the anionic surfactants contain polyglycol ether chains, these chains may have a conventional or, preferably, a narrowed homolog distribution.

Preferred anionic surfactants are selected from the group formed by alkyl and/or alkenyl sulfates, alkyl ether sulfates, alkylbenzenesulfonates, monoglyceride (ether) sulfates and alkanesulfonates, especially fatty alcohol sulfates, fatty alcohol ether sulfates, secondary alkanesulfonates, and linear alkylbenzenesulfonates.

Alkyl and/or Alkenyl Sulfates

Alkyl and/or alkenyl sulfates, frequently also referred to as fatty alcohol sulfates, are the sulfation products of primary alcohols, conforming to the formula (VIII):

$$R^{16}O-SO_3X \qquad (VIII)$$

in which $R^{16}$ is a linear or branched, aliphatic alkyl and/or alkenyl radical having from 6 to 22, preferably from 12 to 18, carbon atoms, and X is an alkali metal and/or alkaline earth metal, ammonium, alkylammonium, alkanolammonium or glucammonium.

Typical examples of alkyl sulfates that may be used in the context of the invention are the sulfation products of caproyl alcohol, caprylyl alcohol, capryl alcohol, 2-ethylhexyl alcohol, lauryl alcohol, myristyl alcohol, cetyl alcohol, palmoleyl alcohol, stearyl alcohol, isostearyl alcohol, oleyl alcohol, elaidyl alcohol, petroselinyl alcohol, arachyl alcohol, gadoleyl alcohol, behenyl alcohol, and erucyl alcohol, and also their technical-grade mixtures obtained by high-pressure hydrogenation of industrial methyl ester fractions or aldehydes from the Roelen oxo process. The sulfation products may be used preferably in the form of their alkali metal salts and in particular of their sodium salts. Particular preference is given to alkyl sulfates based on $C_{16/18}$ tallow fatty alcohols or vegetable fatty alcohols of comparable carbon chain distribution in the form of their sodium salts.

Alkyl Ether Sulfates

Alkyl ether sulfates ("ether sulfates") constitute known anionic surfactants which are prepared industrially by $SO_3$ or chlorosulfonic acid (CSA) sulfation of fatty alcohol or oxo alcohol polyglycol ethers and subsequent neutralization. Ether sulfates suitable in the context of the invention are those which conform to the formula (IX):

$$R^{17}O-(CH_2CH_2O)_aSO_3X \qquad (IX)$$

in which $R^{17}$ is a linear or branched alkyl and/or alkenyl radical having from 6 to 22 carbon atoms, a stands for numbers from 1 to 10, and X is an alkali metal and/or alkaline earth metal, ammonium, alkylammonium, alkanolammonium or glucammonium. Typical examples are the sulfates of adducts of on average from 1 to 10 and in particular from 2 to 5 mol of ethylene oxide with caproyl alcohol, caprylyl alcohol, 2-ethylhexyl alcohol, capryl alcohol, lauryl alcohol, isotridecyl alcohol, myristyl alcohol, cetyl alcohol, palmoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol, and brassidyl alcohol, and also their technical-grade mixtures in the form of their sodium and/or magnesium salts. The ether sulfates may have either a conventional or a narrowed homolog distribution. Particularly preferred is the use of ether sulfates based on adducts of on average from 2 to 3 mol of ethylene oxide with technical-grade $C_{12/14}$ and/or $C_{12/18}$ coconut fatty alcohol fractions in the form of their sodium and/or magnesium salts.

Alkylbenzenesulfonates

Alkylbenzenesulfonates conform preferably to the formula (X):

$$R^{18}-Ph-SO_3X \qquad (X)$$

in which $R^{18}$ is a branched or, preferably, linear alkyl radical having from 10 to 18 carbon atoms, Ph is a phenyl radical, and X is an alkali metal and/or alkaline earth metal, ammonium, alkylammonium, alkanolammonium or glucammonium. Preference is given to using dodecylbenzenesulfonates, tetradecylbenzenesulfonates, hexadecylbenzenesulfonates, and their technical-grade mixtures in the form of the sodium salts.

Monoglyceride (Ether) Sulfates

Monoglyceride sulfates and monoglyceride ether sulfates constitute known anionic surfactants which may be obtained in accordance with the relevant methods of preparative organic chemistry. They are usually prepared starting from triglycerides, which as they are or following ethoxylation are transesterified to the monoglycerides and subsequently sulfated and neutralized. It is likewise possible to react the partial glycerides with suitable sulfating agents, preferably gaseous sulfur trioxide or chlorosulfonic acid [cf. EP 0561825 B1, EP 0561999 B1 (Henkel)]. The neutralized substances may, if desired, be subjected to ultrafiltration in order to reduce the electrolyte content to a desired level [DE 4204700 A1 (Henkel)]. Reviews of the chemistry of the monoglyceride sulfates have appeared, for example, from A. K. Biswas et al. in J. Am. Oil. Chem. Soc. 37, 171 (1960) and F. U. Ahmed J. Am. Oil. Chem. Soc. 67, 8 (1990). The monoglyceride (ether) sulfates for use in the context of the invention conform to the formula (XI):

in which $R^{19}CO$ is a linear or branched acyl radical having from 6 to 22 carbon atoms, c, d and e in total stand for 0 or for numbers from 1 to 30, preferably from 2 to 10, and X is an alkali metal or alkaline earth metal. Typical examples of monoglyceride (ether) sulfates suitable in the context of the invention are the reaction products of lauric monoglyceride, coconut fatty acid monoglyceride, palmitic monoglyceride, stearic monoglyceride, oleic monoglyceride and tallow fatty acid monoglyceride, and also their ethylene oxide adducts with sulfur trioxide or chlorosulfonic acid in the form of their sodium salts. It is preferred to use monoglyceride sulfates of the formula (XI) in which $R^{19}CO$ is a linear acyl radical having from 8 to 18 carbon atoms.

Alkanesulfonates

By alkanesulfonates are meant compounds of the formula (XII):

$R^{20}$ and $R^{21}$ stand for alkyl radicals, and $R^{20}$ and $R^{21}$ together should have not more than 50 carbon atoms.

Appropriately the detergents and cleaning products may contain from 0.1 to 20% by weight, preferably from 0.25 to 15% by weight, in particular from 0.4 to 10% by weight of anionic surfactants, calculated as active substance, based on the compositions. The remainder to 100% by weight of the detergents and cleaning products may be represented by auxiliaries and also water.

As auxiliaries, the compositions of the invention may contain for example solubilizers such as cuminesulfonate, ethanol, isopropyl alcohol, ethylene glycol, propylene glycol, butyl glycol, diethylene glycol, propylene glycol monobutyl ether, polyethylene and/or polypropylene glycol ethers having molar masses of from 600 to 1,500,000, preferably having a molar mass of from 400,000 to 800,000, or in particular butyl diglycol. It is also possible for abrasives, such as quartz flour or wood flour or polyethylene abrasives, to be present.

In many cases, an additional bactericidal effect is desired, and so the compositions may include cationic surfactants or biocides, an example being glucoprotamine.

Suitable builders are zeolites, phyllosilicates, phosphates, and also ethylenediaminetetraacetic acid, nitrilotriacetic acid, citric acid and the salts thereof, and also inorganic phosphonic acids.

Among the compounds which act as peroxy bleaches, particular importance is possessed by sodium perborate tetrahydrate and sodium perborate monohydrate. Examples of further bleaches are peroxycarbonate, citrate perhydrates, and $H_2O_2$-providing peracidic salts of peracids such as perbenzoates, peroxyphthalates or diperoxydodecanedioic acid. They are usually used in amounts of from 0.1 to 40% by weight. Preference is given to the use of sodium perborate monohydrate in amounts of from 10 to 20% by weight and in particular from 10 to 15% by weight.

Suitable enzymes include those from the class of the proteases, lipase, amylases, cellulases, and mixtures thereof. Especially suitable active enzymatic substances are those obtained from bacterial strains or fungi, such as *Bacillus subtilis*, *Bacillus lichenformis* and *Strptomyces griseus*. It is preferred to use proteases of the subtilisin type, and especially proteases obtained from *Bacillus lentes*. Their fraction may amount to from about 0.1 to 6%, preferably from 0.2 to 2%, by weight. The enzymes may be adsorbed on carrier substances or embedded in coating substances in order to protect them against premature decomposition.

In addition to monofunctional and polyfunctional alcohols and phosphonates, the compositions may comprise further enzyme stabilizers. For example, from 0.5 to 1% by weight of sodium formate may be used. Also possible is the use of proteases stabilized with soluble calcium salts, with a calcium content of preferably about 1.2% by weight, based on the enzyme. However, it is particularly advantageous to use boron compounds, examples being boric acid, boron oxide, borax, and other alkali metal borates such as the salts of orthoboric acid ($H_3BO_3$), of metaboric acid ($HBO_2$), and of pyroboric acid (tetraboric acid $H_2B_4O_7$).

In the context of use in machine laundering processes, it may be of advantage to add customary foam inhibitors to the compositions. Suitable foam inhibitors contain, for example, known organoolysiloxanes and/or paraffins or waxes. Also present, moreover, may be foam regulators, such as soap, fatty acids, especially coconut fatty acid and palm kernel fatty acid, for example.

As thickeners it is possible, for example, to use hydrogenated castor oil, salts of long-chain fatty acids, which are used preferably in amounts of from 0 to 5% by weight and in particular amounts of from 0.5 to 2% by weight, examples being sodium, potassium, aluminum, magnesium and titanium stearates or the sodium and/or potassium salts of behenic acid, and further polymeric compounds. The latter preferably include polyvinylpyrrolidone, urethanes, and the salts of polymeric polycarboxylates, examples being homopolymeric or copolymeric polyacrylates, polymethacrylates and, in particular, copolymers of acrylic acid with maleic acid, preferably those composed of from 50 to 10% by weight of maleic acid. The relative molecular mass of the homopolymers is generally between 1,000 and 100,000, that of the copolymers between 2,000 and 200,000, preferably between 50,000 to 120,000, based on the free acid. In particular, water-soluble polyacrylates are also suitable which are crosslinked, for example, with about 1% of a polyallyl ether of sucrose and which possess a relative molecular mass of more than 1,000,000. Examples of these are polymers obtainable under the name Carbopol® 940 and 941. The crosslinked polyacrylates are used preferably in amounts of not more than 1% by weight with particular preference in amounts of from 0.2 to 0.7% by weight.

In a further embodiment, preference is given to detergents and cleaning products, particularly compositions for automatic dishwashers, which contain from 0.1 to 15%, preferably from 0.5 to 12%, by weight of surfactants which contain hydroxy mixed ethers of the formula (I), contain from 5 to 90%, preferably from 10 to 80%, by weight of builders, from 0.1 to 6% by weight of cleaning product enzyme, optionally from 0.1 to 40%, preferably from 0.5 to 30%, by weight of bleaches and addition materials. Percent by weight is to be understood as being based on the composition.

The present invention further provides for the use of hydroxy mixed ethers for washing and cleaning hard surfaces, preferably within the home and in the industrial and institutional sector. Particularly appropriate is their use in ware cleaners, rinse aids, bathroom cleaners, floor cleaners, cleaners in accordance with the clean shower concept (e.g., bathroom cleaner which is sprayed onto walls and fittings before and after showering so that water and soap residues run off more effectively and so subsequent wiping is unnecessary), cockpit cleaners (automobile, aircraft, boat, motorbike), window cleaners and all-purpose cleaners. Hard surfaces include ceramic areas, metal areas, painted areas, plastics surfaces, and surfaces of glass, stone, concrete, porcelain, and wood.

Particular preference is given to the use of the hydroxy mixed ethers of the invention for washing and cleaning hard surfaces, especially in machine dishwashing detergents and/or rinse aids which then have a particularly high plastics compatibility and exhibit a very good runoff behavior.

Preference is also given to the use of hydroxy mixed ethers in combination with alkyl and/or alkenyl oligoglycosides in the areas of cleaning listed up to now.

Very particular preference attaches to the hydroxy mixed ethers of the invention, alone or in combination with the other surfactants already described, for the preparation of solid cleaner formulations.

The present invention will now be illustrated in more detail by reference to the following specific, non-limiting examples.

EXAMPLES

Screening Method for Evaluating the Wetting Properties of Surfactant Solutions for Plastics Materials:

The wetting properties of surfactant solutions for plastics were determined in a simplified screening process in accordance with the conditions/test parameters in a commercially customary machine dishwasher, but without using such a machine.

In order to evaluate the wetting properties, plastic test specimens measuring 20×5 cm are cleaned first with 1% strength NaOH and then with isopropanol. The test specimens pretreated in this way are then immersed in the test solution and removed again directly. Evaluation is carried out visually by compiling an ordered list and in accordance with a ratings scale from 1–5. 5 here means that the liquid film breaks open spontaneously and wetting is completely eliminated. Rating 5 is obtained when using water. Rating 1 denotes complete wetting of the plastics surface with uniform runoff of the liquid film. Rating 1 is obtained when using Na-LAS (e.g., Maranil A 55/COGNIS).

Test parameters:

| | |
|---|---|
| Water hardness: | 2° d [German hardness] |
| Salt load: | 700 ppm |
| Temperature: | 60° C. |
| Surfactant concentration: | 0.1% |

Test Specimens:
PP (polypropylene); PE (polyethylene); PC (polycarbonate)

Table 1 shows the test results, with V1 to V5 showing comparative tests and 1 showing the inventive example.

TABLE 1

Wetting properties on plastics

| Composition in % active substance | V1 | V2 | V3 | V4 | V5 | 1 |
|---|---|---|---|---|---|---|
| Fatty alcohol $C_8$–$C_{10}$ + (3 PO/40 EO)-2-hydroxy-dodecyl ether (randomized) | — | — | — | — | — | 0.1 |
| Fatty alcohol $C_8$–$C_{10}$ + 60EO-2-hydroxydodecyl ether | — | — | — | — | 0.1 | — |
| Fatty alcohol $C_8$–$C_{10}$ + 10EO-2-hydroxydodecyl ether | — | — | — | 0.1 | — | — |
| Poly Tergent SLF-18B-45* | — | — | 0.1 | — | — | — |
| Maranil A 55 (Na-LAS) | — | 0.1 | — | — | — | — |
| Water, 2° d/700 ppm NaCl | 100 | 99.9 | 99.9 | 99.9 | 99.9 | 99.9 |
| Wetting properties on plastics | | | | | | |
| Temperature: 60° C./plastic "PP" | 5 | 1 | 3 | 4 | 3 | 2 |
| Temperature: 60° C./plastic "PE" | 5 | 1 | 3 | 4 | 3 | 2 |
| Temperature: 60° C./plastic "PC" | 5 | 1 | 4 | 3 | 3 | 3 |

*alcohol alkoxylate from Olin Chemicals with 1 PO and 22 EO,

In the stress crack corrosion test, the plastic rods are briefly exposed to the test product by immersion or spraying. Adhering product is not removed. After 24 hours, spraying or immersion is repeated. In total, the plastics are exposed to the test medium 5 times. Final assessment takes place visually after 14 days. The codes are as follows:

| | |
|---|---|
| "1" | unchanged |
| "2" | incipient cracking/small crack |
| "3" | continuous crack |
| "4" | fracture |

The inventive examples is placed there in Table 2 under 1, V1 to V4 showing comparative tests.

TABLE 2

Stress crack corrosion test

| Composition in % active substance | V1 | V2 | V3 | V4 | 1 |
|---|---|---|---|---|---|
| Fatty alcohol $C_8$–$C_{10}$ + (3 PO/40 EO)-2-hydroxydodecyl ether (randomized) | — | — | — | — | 5 |
| Fatty alcohol $C_8$–$C_{10}$ + 40EO-2-hydroxydodecyl ether | — | — | — | 5 | — |
| Fatty alcohol $C_8$–$C_{10}$ + 10EO-2-hydroxydodecyl ether | — | — | 5 | — | — |
| Poly Tergent SLF-18B-45* | — | 5 | — | — | — |
| Water, fully deionized | 100 | 95 | 95 | 95 | 95 |
| Stress crack corrosion test on plastics Assessment after 14 days | | | | | |
| Terez 3010 (ABS) | 1** | 4 | 4 | 3 | 3 |
| Makrolon 3103 (PC) | 1 | 3 | 3 | 2 | 2 |

*alcohol alkoxylate from Olin Chemicals with 1 PO and 22 EO.

TABLE 3

| Melting points/ranges | ° C. |
|---|---|
| Fatty alcohol $C_8$–$C_{10}$ + (3 PO/40 EO)-2-hydroxydodecyl ether (randomized) | 32–34 |
| Fatty alcohol $C_8$–$C_{10}$ + 60EO-2-hydroxydodecyl | 48 |

TABLE 3-continued

| Melting points/ranges | °C. |
|---|---|
| ether | |
| Fatty alcohol C$_8$–C$_{10}$ + 40EO-2-hydroxydodecyl ether | 43 |
| Fatty alcohol C$_8$–C$_{10}$ + 30EO-2-hydroxydodecyl ether | 38–39 |
| Fatty alcohol C$_8$–C$_{10}$ + 10EO-2-hydroxydodecyl ether | At RT, liquid with turbidities |
| Poly Tergent SLF-18B-45* | 27–32 |

*alcohol alkoxylate from Olin Chemicals with 1 PO and 22 EO, RT: room temperature It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A reaction product comprising one or more hydroxy mixed ethers corresponding to the general formula (I):

$$R^1O[CH_2CHR^4O]_x[CH_2CHR^3O]_yCH_2CH(OH)R^2 \quad (I)$$

wherein $R^1$ represents an alk(en)yl radical having from 6 to 16 carbon atoms; $R^2$ represents an alk(en)yl radical having from 2 to 22 carbon atoms; $R^3$ represents a hydrogen or a methyl radical; $R^4$ represents a hydrogen or a methyl radical; x is from 1 to 40; y is from 1 to 40; and x+y>=1; and wherein the alkylene units —CH$_2$CHR$^3$O— and —CH$_2$CHR$^4$O— are in randomized form, wherein the one or more hydroxy mixed ethers have a ratio of ethylene oxide groups to propylene oxide groups of from 40:1 to 40:5, wherein the one or more hydroxy mixed ethers has an average degree of ethoxylation of about 40.

2. The reaction product according to claim 1, wherein $R^2$ represents an alk(en)yl radical having from 6 to 16 carbon atoms.

3. A reaction product prepared by reacting a 1,2-epoxy compound of the general formula R$^2$CHOCH$_2$, wherein $R^2$ represents an alk(en)yl radical having from 2 to 22 carbon atoms, and a randomly alkoxylated C$_{6-16}$ alcohol having a ratio of ethylene oxide groups to propylene oxide groups of from 40:1 to 40:5 wherein the reaction product has an average degree of ethoxylation of about 40.

4. A cleaning composition comprising:
   (a) one or more hydroxy mixed ethers corresponding to the general formula (I):

$$R^1O[CH_2CHR^4O]_x[CH_2CHR^3O]_yCH_2CH(OH)R^2 \quad (I)$$

wherein $R^1$ represents an alk(en)yl radical having from 6 to 16 carbon atoms; $R^2$ represents an alk(en)yl radical having from 2 to 22 carbon atoms; $R^3$ represents a hydrogen or a methyl radical; $R^4$ represents a hydrogen or a methyl radical; x is from 1 to 40; y is from 1 to 40; and x+y>=1; and wherein the alkylene units —CH$_2$CHR$^3$O— and —CH$_2$CHR$^4$O— are in randomized form, wherein the one or more hydroxy mixed ethers have a ratio of ethylene oxide groups to propylene oxide groups of from 40:1 to 40:5, wherein the one or more hydroxy mixed ethers has an average degree of ethoxylation of about 40.

5. The cleaning composition according to claim 4, further comprising an alk(en)yl oligoglycoside corresponding to the general formula (II):

$$R^5O-[G]_p \quad (II)$$

wherein $R^5$ represents an alk(en)yl radical having from 4 to 22 carbon atoms, G represents a sugar radical having 5 or 6 carbon atoms, and p represents a number of from 1 to 10.

6. The cleaning composition according to claim 4, wherein $R^2$ represents an alk(en)yl radical having from 6 to 16 carbon atoms.

7. The cleaning composition according to claim 4, wherein the one or more hydroxy mixed ethers are present in an amount of from 0.01 to 25% by weight, based on the composition.

8. The cleaning composition according to claim 5, wherein the one or more hydroxy mixed ethers are present in an amount of from 0.01 to 25% by weight, based on the composition; and wherein the alk(en)yl oligoglycoside is present in an amount of from 0.01 to 30% by weight, based on the composition.

9. A method comprising:
   (a) providing a cleaning composition;
   (b) providing one or more hydroxy mixed ethers corresponding to the general formula (I):

$$R^1O[CH_2CHR^4O]_x[CH_2CHR^3O]_yCH_2CH(OH)R^2 \quad (I)$$

wherein $R^1$ represents an alk(en)yl radical having from 6 to 16 carbon atoms; $R^2$ represents an alk(en)yl radical having from 2 to 22 carbon atoms; $R^3$ represents a hydrogen or a methyl radical; $R^4$ represents a hydrogen or a methyl radical; x is from 1 to 40; y is from 1 to 40; and x+y>=1; and wherein the alkylene units —CH$_2$CHR$^3$O— and —CH$_2$CHR$^4$O— are in randomized form, wherein the one or more hydroxy mixed ethers have a ratio of ethylene oxide groups to propylene oxide groups of from 40:1 to 40:5, wherein the one or more hydroxy mixed ethers has an average degree of ethoxylation of about 40;
   (c) combining the one or more hydroxy mixed ethers and the cleaning composition.

* * * * *